United States Patent [19]

Pettersen

[11] 4,177,599
[45] Dec. 11, 1979

[54] DOWNRIGGER RELEASE DEVICE

[76] Inventor: Alfred Pettersen, 345 Foul Bay Rd., Victoria, British Columbia, Canada

[21] Appl. No.: 878,185

[22] Filed: Feb. 15, 1978

[51] Int. Cl.² .............................................. A01K 91/00
[52] U.S. Cl. .................................. 43/43.12; 43/44.91
[58] Field of Search .................... 43/17.2, 43.12, 44.9, 43/44.91, 44.92, 44.93, 44.95, 44.97, 44.87, 44.88; 24/115 F, 136 L, 201 R

[56] References Cited

U.S. PATENT DOCUMENTS

| | | | |
|---|---|---|---|
| 3,641,700 | 2/1972 | Harrison | 43/43.12 |
| 3,738,047 | 6/1973 | Tozer | 43/43.12 |
| 3,765,118 | 10/1973 | Reitler | 43/43.12 |

Primary Examiner—Nicholas P. Godici
Assistant Examiner—K. Bradford Adolphson
Attorney, Agent, or Firm—Emory L. Groff, Jr.

[57] ABSTRACT

A downrigger release device for use in deep water fishing with a downrigger line includes an elongated body with a connecting line passing through and fixed therein, one end of the connecting line being attached to the downrigger and the other end carrying a pin. The pin is provided with a groove in one end for receiving a fishing line above the lure or bait. When the pin is inserted into aligned apertures in arms extending outwardly from the body of the release device, the fishing line is releasably connected to the downrigger, which is merely a sinker for taking the lure or bait to the desired depth. When a fish strikes, the pin is pulled out of the body by the force on the fishing line to release the latter, the body and pin of the release device remaining on the connecting line attached to the downrigger.

2 Claims, 6 Drawing Figures

DOWNRIGGER RELEASE DEVICE

BACKGROUND OF THE INVENTION

1. Field of the Invention

This invention relates to a downrigger release device for use in deepwater fishing.

2. Description of the Prior Art

Canadian Pat. No. 901,920, which issued to R. G. Harrison on May 20, 1972 discloses a sinker release device for use with fishing tackle. The Harrison apparatus includes an elongated body with a longitudinally extending passage therein for mounting the body on a fishing line, with two spaced apart wings extending outwardly from one side of the body for receiving a plug or pin. The pin has the same diameter as aligned pin-receiving holes in the wings, so that the pin is held in the wings by a friction fit. The pin is also provided with a transversely extending hole near one end thereof. A fishing line extends through the hole and is inserted with the pin into the body of the release device. A sinker may be releasably mounted on the pin between the wings. When a fish strikes, the pin is released; i.e., pulled out of the wings, and slides along the line to the area of the hook or lure, the body remaining fixed in one position on the fishing line.

It has been found that the Harrison apparatus can be used as a tripper or downrigger release device when using a fishing line and a separate downrigger, i.e., a strong line with a weight on its bottom end. The body of the tripper is fixedly mounted on the downrigger line, and a pin with a fishing line extending through the transverse hole is inserted through the wings. When a fish strikes, the pin is released and slides along the fishing line to the hook or lure, and the tripper body remains on the downrigger line.

Such a tripper device presents difficulties. For example, when the fishing line is being fed out, the pin must be held manually. Often there are 10 to 60, usually 20 to 30 feet between the tripper body and the hook, and thus three hands are required to feed out the fishing line and to hold the pin. Moreover, if the fishing line snaps because of a heavy fish, the pin is lost. Thus, it is usually necessary to carry a supply of spare pins.

The object of the present invention is provide a downrigger release device which alleviates the above-mentioned difficulties.

SUMMARY OF THE INVENTION

Accordingly, this invention relates to a downrigger device for use in deep water fishing with a downrigger line comprising an elongated body, a passage in said body for fixedly receiving a connecting line for connecting one end of the body to the downrigger line; at least one arm extending outwardly from one side of the body; an aperture in said arm, the longitudinal axis of said aperture being substantially parallel to the longitudinal axis of the body; a pin releasably insertable into said aperture; a slot in one end of said pin for receiving a fishing line, whereby the fishing line is retained in said arm when the pin is inserted into said aperture, the fishing line being releasable from the body when force is applied to the fishing line; and connector means on the other end of said pin for attaching the pin to the connecting line and to the other end of said body, whereby the body, connecting line and pin form a single unit connected to the downrigger line.

More specifically, the release device includes a pair of parallel arms integral with and extending outwardly from one side of the body substantially at right angles thereto, with a pair of aligned apertures in the outer free ends of the arms, the longitudinal axes of the apertures being parallel to the longitudinal axes of the passage and the body of the release device.

With the device described above, the release device is always connected to the downrigger line immediately above the sinker. The downrigger line, which is strong, e.g. 200 pound test line, seldom breaks, and thus very few release devices or parts thereof will be lost. When the fishing line is retained by the release device and a fish strikes, the force of the fish pulls the pin out of the aperture(s) in the arm, releasing the fishing line.

DESCRIPTION OF THE PREFERRED EMBODIMENT

Figure 1:
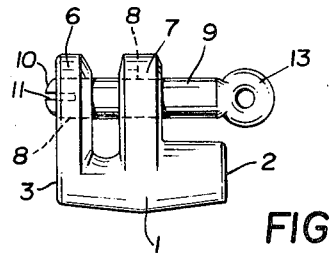
FIG. 1 is an elevation view of a downrigger release device in accordance with the present invention.
Figure 2:
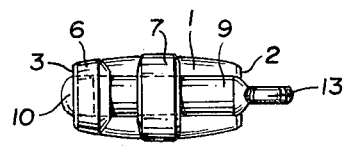
FIG. 2 is a plan view of the device of FIG. 1.
Figure 3:
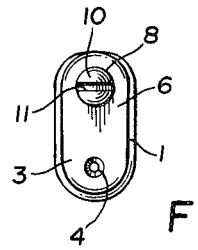
FIG. 3 is an end view, taken from the left of FIG. 1, of the device of FIGS. 1 and 2.
Figure 4:
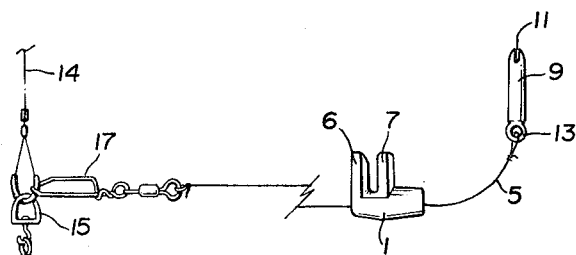
FIGS. 4 to 6 are schematic elevation views of the device of FIGS. 1 to 3 in use.
Figure 5:
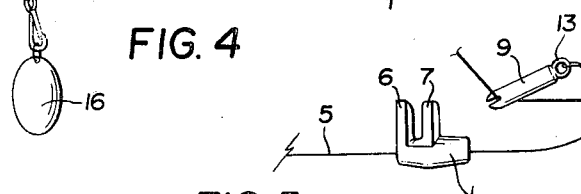
Figure 6:
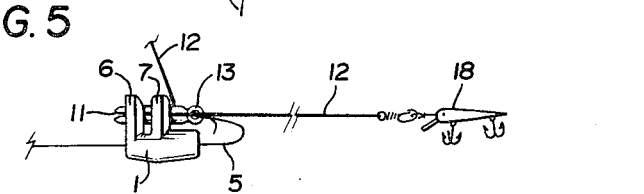

With reference to FIGS. 1 to 3, the preferred embodiment of the downrigger release device of this invention includes an elongated body 1 of generally elliptical cross-sectional configuration, with planar ends 2 and 3. The body 1 is provided with a passage 4 extending between the ends 2 and 3 for receiving a connecting line 5 (FIGS. 4 to 6). The line 5 is knotted, with the knots (not shown) in the passage 4, so that the body 1 is fixedly mounted in one position on the line 5. A pair of arms 6 and 7 integral with the body 1 extend outwardly from one side of the body. One arm 6 is adjacent one end 3 of the body 1 and the other arm 7 is located approximately at the centre of the body. The arms 6 and 7 are parallel to each other and perpendicular to the body 1.

An aperture 8 is provided in each arm 6 and 7 for slidably receiving a pin 9. The diameter of the apertures 8 is approximately equal to the diameter of the pin 9, so that there is a tight, friction fit between the pin and the arms 6 and 7. One end 10 of the pin 9 is rounded, and is provided with a transversely extending groove 11 for receiving a fishing line 12 (FIGS. 5 and 6) as described in greater detail hereinafter. The other end of the pin 9 is provided with connector means in the form of a loop 13, which is integral with the pin for attaching the pin 9 to one end of the connecting line 5.

The body 1 and the pin 9 are formed of a hard plastic such as polyethylene or TEFLON (a registered trade mark for polytetrafluoroethylene), the body and pin being molded separately in single injection molding operations.

Referring now to FIGS. 4 to 6, the downrigger release device is used to connect a fishing line 12 to a downrigger line 14. The downrigger line 14 is merely a strongline, e.g. 200 lb. test line, with a linkage 15 at its outer end carrying a heavy sinker 16, i.e., an 8 to 10 lb. weight, for causing the line to sink in deep water fishing. One end of the connecting line 5 extending through the body 1 is attached to the pin 9, and the other end of the line 5 is connected to the linkage 15 by another linkage 17. Normally, the downrigger release device, including the body 1, pin 9, connecting line 5 and linkage 17 would come as a unit, and it is merely necessary to clip the device onto a downrigger as illustrated in FIG. 4.

With the release device connected to the downrigger, the first step is to let out the desired amount of fishing line 12 depending on the desired distance between the sinker 16 and lure 18. Then, the fishing line 12 is slid into the groove 11 in the pin 9, and the latter is inserted into the apertures 8 in the arms 6 and 7 with the fishing line 12 (FIG. 6). When a fish strikes the bait (lure 18), the pin 9 is pulled out of the arms 6 and 7, releasing the fishing line 12. The body 1 and the pin 9 remain attached to the connecting line 5 and thus to the downrigger.

While the release device described above includes a pair of arms 6 and 7 for releasably receiving the pin 9, it will be appreciated that a single arm could replace this pair of arms on one side of the body 1. If a single arm is used, it would be thicker than either of the arms 6 or 7 and contain an aperture aligned with the longitudinal axes of the passage 4 and the body 1. The use of such a release device would be the same as that of FIGS. 1 to 3.

With the release device described hereinbefore, it is readily apparent that only one body 1 and pin 9 are required for each downrigger and fishing line. If the fishing line breaks, the pin is not lost. Moreover, the device is relatively easy to use and inexpensive to manufacture.

I claim:

1. A downrigger release device for use in deep water fishing with a downrigger line comprising an elongated body, a passage in said body for fixedly receiving a connecting line for connecting one end of the body to the downrigger line; a first arm extending outwardly from one side of the body; an aperture in said arm, the longitudinal axis of said aperture being substantially parallel to the longitudinal axis of the body; a pin releasably insertable into said aperture; a slot in one end of said pin for receiving a fishing line, whereby the fishing line is retained in said arm when the pin is inserted into said aperture, the fishing line being releasable from the body when force is applied to the fishing line; and connector means on the other end of said pin for attaching the pin to the connecting line and to the other end of said body, whereby the body, connecting line and pin form a single unit connected to the downrigger line.

2. A device according to claim 1, including a second arm, said first and second arms integral with said body and extending outwardly from said one side of the body substantially at right angles thereto; and a second aperture in said second arm forming a pair of aligned apertures in the outer free ends of the arms, the longitudinal axes of said apertures being parallel to the longitudinal axes of said passage and the body.

* * * * *